Feb. 20, 1968   E. H. LORENCE   3,369,672
TURNTABLE DRIVE MECHANISM
Filed Nov. 22, 1965   2 Sheets-Sheet 1
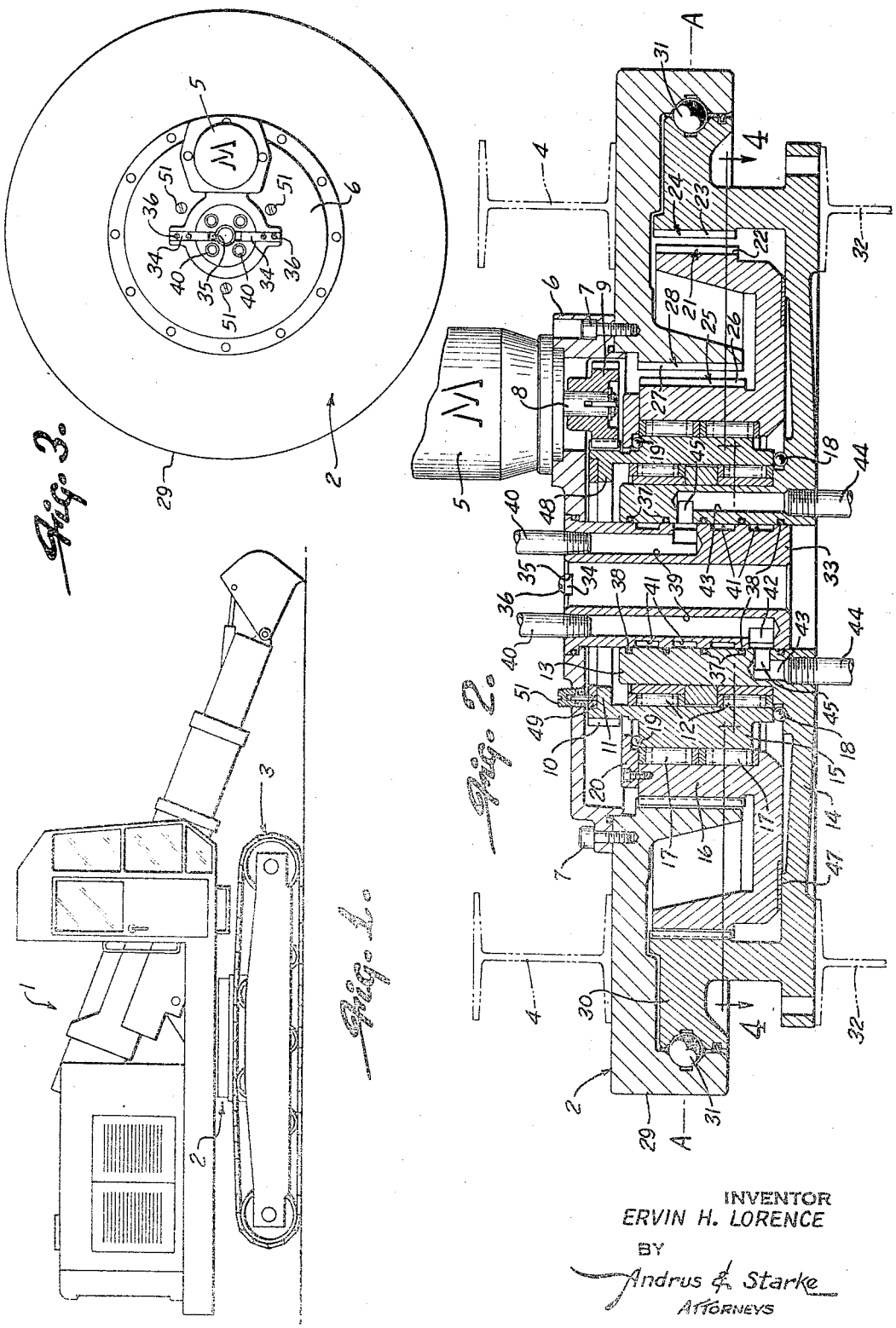
INVENTOR
ERVIN H. LORENCE
BY
Andrus & Starke
ATTORNEYS INVENTOR
ERVIN H. LORENCE
BY
Andrus & Starke
ATTORNEYS

United States Patent Office 3,369,672
Patented Feb. 20, 1968

3,369,672
TURNTABLE DRIVE MECHANISM
Ervin H. Lorence, Milwaukee, Wis., assignor to Lorence Manufacturing Corporation, Milwaukee, Wis., a corporation of Wisconsin
Filed Nov. 22, 1965, Ser. No. 509,031
15 Claims. (Cl. 212—69)

ABSTRACT OF THE DISCLOSURE

The invention relates to a turntable drive mechanism for heavy construction equipment. The drive mechanism includes a hydraulic motor mounted on the turntable which drives an eccentric journalled about a central sleeve and the eccentric drives a gear unit including a pair of integrally formed gears, a large outer gear and a small inner gear. The teeth of the outer gear mesh with a series of internal teeth of a fixed outer gear ring, and the outer gear ring has a greater number of teeth than the outer gear so that the external diameter of the outer gear is smaller than the internal diameter of the outer gear ring. As the eccentric is rotated, the outer gear will be moved by a wedging action in the opposite direction and at a slower rate of speed to provide a speed reduction.

The inner gear rotates with the outer gear, and the teeth of the inner gear mesh with a series of internal teeth of a second gear ring connected to the turntable. The inner gear ring has a greater number of teeth than the mating inner gear and as the inner gear rotates, the inner gear is moved by a wedging action in the opposite direction to provide a second speed reduction for the turntable.

The outer edge of the turntable is provided with a flange which is journalled around the outer gear ring to guide the turntable in rotary movement.

---

This invention relates to a drive mechanism for construction equipment and more particularly to a turntable drive mechanism for backhoes, cranes and the like.

The conventional turntable for heavy construction equipment, such as a backhoe or crane, is generally driven by a hydraulic motor acting through a gear train transmission. In order to drive the turntable at a relatively slow speed of 4 to 6 r.p.m., an expensive and complicated gear train is employed to provide the necessary speed reduction.

In place of a hydraulic motor, smaller units may employ less clostly hydraulic cylinders to rotate the turntable. However, the hydraulic cylinders are capable of rotating the turntable only through a small arc and a full 360° rotation cannot be obtained.

The present invention is directed to a turntable drive mechanism for heavy construction equipment which provides a 360° rotation and is substantially less costly and smaller in size than the conventional unit having the same reduction capacity. According to the invention, a hydraulic motor mounted on the turntable drives an eccentric journaled about a central sleeve in the drive unit, and the eccentric, in turn, is journaled within and drive a gear unit. The gear unit includes a pair of integrally formed gears, a large outer gear and a smaller inner gear. The large outer gear has a series of teeth which mesh with the internal teeth of a fixed outer gear ring. The teeth in the outer gear ring are of identical size to the teeth in the outer gear, but the outer gear ring has a greater number of teeth than the outer gear so that the external diameter of the outer gear is substantially smaller than the internal diameter of the outer gear ring. As the eccentric is rotated, the large outer gear will be moved by a wedging action in the opposite direction at a slower rate of speed to provide a speed reduction.

The second or inner gear which rotates with the larger outer gear is also provided with a series of teeth which are identical in size to the teeth in the outer gear and mesh with the internal teeth of a second freely movable inner gear ring. The inner gear ring has a greater number of teeth than the mating inner gear and the difference in numbe of teeth between the inner gear and the inner gear ring is the same as the difference in number of teeth between the outer gear and the outer gear ring. The inner gear ring is mounted concentrically with the axis of the turntable and is connected to the turntable so that the turntable will rotate in accordance with rotation of the inner gear ring.

The inner gear which is secured to the larger outer gear rotates with the outer gear and at the same speed. As the teeth in the inner gear are of the identical size as the teeth in the outer gear, the inner gear ring will be moved by a wedging acton in the opposite direction and at a slower rate of speed than the inner gear to provide a second speed reduction.

The drive mechanism of the invention provides a substantial speed reduction from the hydraulic motor to the turntable with a minimum number of parts. By reducing the number of parts, the overall cost of the drive mechanism is reduced over conventional units. Moreover, the drive mechanism is highly compact and has substantially less weight than the conventional unit and yet permits the turntable to rotate with a variable speed throughout a full 360° travel.

The engagement of the gears with the gear rings provides a positive lock against free turntable rotation and eliminates the necessity for a turntable locking mechanism. This positive lock provided by the gears prevents the cab and turntable from rotating by gravity if the backhoe is parked on a hill or slope. In the conventional drive mechanism a brake mechanism is required to prevent free rotation by gravity movement of the cab.

As a substantial number of teeth of each gear are in engagement with teeth on the corresponding gear ring at any one time a stronger unit is provided which is not dependent on the individual strength of the gear teeth. Moreover, the vertical centerlines of the gear teeth and gear ring teeth, as well as the bearings lie on substantially the same horizontal plane which provides a more effective transmission of power between the elements.

Other objects and advantages will appear in the course of the following description. The drawings illustrate the best mode presently contemplated of carrying out the invention.

In the drawings:

FIGURE 1 is a side elevation of a conventional backhoe employing the drive mechanism of the invention;

FIG. 2 is a vertical section showing the turntable drive mechanism;

FIG. 3 is a plan view of the turntable;

Figure 4:
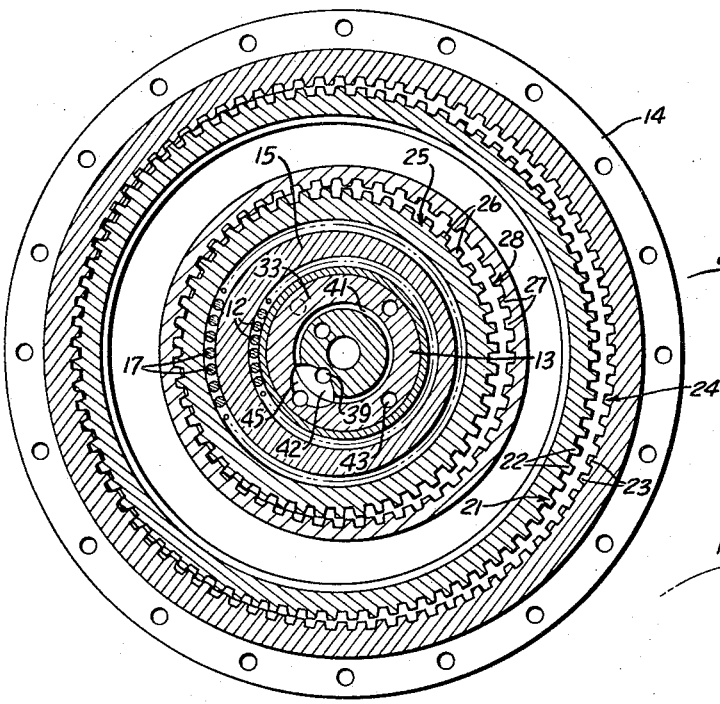
FIG. 4 is a section taken along line 4—4 of FIG. 2.

The drawings illustrate a conventional backhoe, including a cab and engine unit 1 supported on a turntable 2 which is mounted for rotation on the frame or supporting structure 3 of the backhoe. As shown in FIG. 2, a pair of beams 4 are secured to the upper surface of the turntable 2 and support the cab 1 so that the cab will rotate in accordance with rotation of the turntable.

A reversible variable speed hydraulic motor 5 is mounted on a casting 6 which is connected by bolts 7 to the turntable 2. The drive shaft 8 of the hydraulic motor 5 carries a pinion 9 which engages a gear 10 formed on the hub 11. Hub 11 is journaled by roller bearing assemblies 12 about a central sleeve 13 formed integrally with base casting 14.

The central portion of the hub 11 defines an eccentric 15 which is journaled for rotation within a ring or gear member 16 by roller bearing assemblies 17. In addition, the lower end of hub 11 is supported on thrust bearings 18 and a second series of thrust bearings 19 are located between the upper end of eccentric 15 and a retaining ring 20 secured to gear member 16.

Gear member 16 is generally U-shaped in cross-section and the outer portion of member 16 defines a gear 21 having a series of teeth 22 which engage teeth 23 formed on inner surface of a fixed gear ring 24. Gear ring 24 is formed integrally with base casting 14.

In addition to the gear 21, the upper portion of U-shaped member 16 defines a second smaller gear 25 having a series of teeth 26 which mesh with the teeth 27 on a gear ring 28 which is an integral part of turntable 2. The outer periphery of turntable 2 is provided with a downwardly extending flange 29, and flange 29 is mounted for rotation about the outer end 30 of base casting 14 by a series of ball bearings 31.

The turntable upper casting 6, and hydraulic motor 5 will all rotate with respect to the base casting 14 which is secured to the beams 32 carried by the side rails of the frame 3 of the backhoe.

The teeth 22 and 23 are of identical shape and size. The shape of the teeth 22 and 23 is not critical, with the particular shape depending on the diameter of the gear 21 and the gear ring 24.

While the teeth 22 and 23 are of identical size and shape, the ring 24 has a greater number of teeth 23 than the teeth 22. Generally there will be from 2 to 4 more teeth 23 than teeth 22. This results in the external diameter of the gear 21 being substantially smaller than the internal diameter of the gear ring 24, as shown in FIG. 4. Due to the difference in the number of teeth, only about 10 or 12 of the teeth 22 will be in engagement with the teeth 23 at any time during rotation of the gear 21.

The throw of the eccentric 15 has a definite relation to the pitch diameter of the teeth 22 and 23 and the difference between the pitch diameter of the teeth 22 and 23 determines the throw. For example, if there are about 40 8-pitch teeth 23, or a pitch diameter of 5 inches, and there are 37 8-pitch teeth 22, or a pitch diameter of 4⅝ inches, the difference in pitch diameter would be ⅜ of an inch and the throw of the eccentric would be ½ of the difference in pitch diameter or 3/16 of an inch.

The teeth 26 are identical in size and shape to the teeth 27 and are also identical in size and shape to the teeth 22 and 23. There are a lesser number of teeth 26 than teeth 27 and the difference between the number of teeth 26 and 27 is the same as the difference in number of teeth between the teeth 22 and 23. For example, if there are 85 teeth 23 and 82 teeth 22, a difference of 3, there can be 40 teeth 27 and 37 teeth 26, also a difference of 3.

The eccentric 15 is journalled freely within the central sleeve 13 of base casting 14. As the eccentric rotates, the ring 16 is moved at a reduced speed in the opposite direction of rotation of eccentric 15 by a wedging type of action. For example, if the gear ring 24 contains 85 teeth while the gear 21 contains 82 teeth, a difference of 3, the gear 21 will move through an arc equal to the length of three teeth during each revolution of the eccentric 15. This is more clearly shown in FIG. 5. Point A on gear 21 will move to a point B during one revolution of the eccentric 15 and the arc AB is equal to the arc inscribed by three teeth, which is a difference in the number of teeth between gear ring 24 and gear 21. Thus, a speed reduction is provided between the input shaft and the gear 21 and the gear will only move to an arc equal in length to the difference in the number of teeth between the gear 21 and the gear ring 24 during each revolution of the hub 11.

Figure 5:
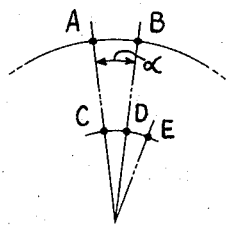
FIG. 5 is a diagrammatic representation showing the relative movement of the transmission elements.
Figure 6:
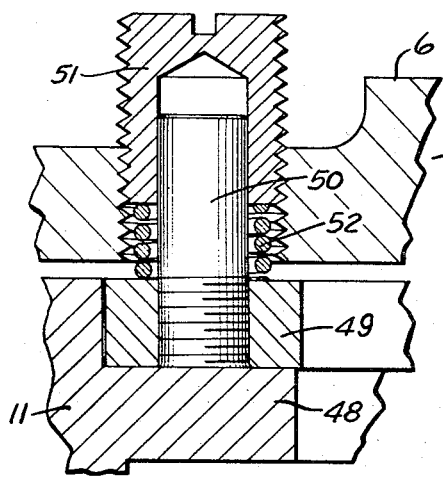
FIG. 6 is an enlarged vertical section of the braking unit.

As the gear 25 is fixed to the gear 21, the gear 25 will move through the same angular displacement as the gear 21. Referring to FIG. 5, if the gear 21 is moved a distance AB equal to the length of three teeth for each revolution of the hub 11, the gear 25 will be moved through the same angular displacement shown by α in FIG. 5. However, as the teeth 26 on gear 25 are the same size as the teeth 22 on gear 25 the angular displacement A does not equal the arc CE inscribed by the three teeth on gear 25. Thus, as the gear 25 moves with the gear 21 the ring 28 and turntable 2 slip or move by a wedging action, in the opposite direction to compensate for this difference DE between the angular displacement CD and the arc CE described by 3 teeth. The ring 28 slips or moves in the opposite direction a distance sufficient to enable the teeth 26 of the gear 25 to maintain engagement with the teeth 27 of ring 28 and this results in the ring 28 moving in the opposite direction and at a slower speed than the gear to provide a second reduction. Speed reduction between the gear 25 and the ring 28 will be proportional to the arc DE. As previously mentioned, the turntable 2 is integral with the ring 28 and will rotate with the ring 28 at a slow variable speed generally in the range of 4 to 6 r.p.m.

As best illustrated in FIG. 2, the vertical center lines or midpoints of the gear teeth 22, gear ring teeth 23, gear teeth 26 and gear ring teeth 27 all line in the same horizontal plane, indicated by A in FIG. 2. In addition, the vertical midpoints of roller bearing assemblies 12 and 17 and the ball bearing assembly 31 lie substantially in the plane A. As all of the power transmitting elements as well as hte journalling elements are centered on the horizontal plane A, the transmission of force is concentrated in that plane and moment arms resulting from offset forces are eliminated.

With the large weight of the turntable and its superstructure, a sudden start or stop will develop considerable load, and due to the fact that the gear ring 24 and inner sleeve 13 are both formed integrally with the base casting 14, the braking and starting loads are at least partially absorbed by the roller bearing assemblies 12 at the center of the unit.

In order to provide a connection for hydraulic lines through the rotating turntable, a hydraulic sleeve coupling 33 is journalled for rotation within the central opening in the sleeve 13. A pair of keys 34 are located within aligned slots 35 formed in the upper surface of the casting 6 and in the upper end coupling 33 and are secured in the slots by screws 36. The keys 34 provide a connection between the upper casting 6 and the coupling 33 so that the coupling will rotate in accordance with rotation of the casting 6 and turntable 2.

The inner surface of the sleeve 13 is provided with a series of recesses 37 and O-ring seals 38 located within the recesses to prevent leakage of oil or other hydraulic fluid between the members.

The coupling 33 is provided with a series of vertical passages 39 which are located 90° apart. An oil or other hydraulic fluid supply line 40 is connected to the upper end of each of the passages 39 and serves to supply oil to the passages. The outer periphery of the coupling 33 is provided with a series of vertically spaced recesses or grooves 41, with the number of grooves corresponding to the number of oil passages 39. A curved recess 42 provides communication between one of the oil passages 39 and one of the peripheral grooves 41 so that oil from the passage can flow freely into the peripheral groove. In addition, the sleeve 13 is also provided with a series of vertical oil passages 43 and hydraulic lines 44 are connected to the lower ends of each of the passages. A curved recess 45 connects each of the passages 43 in sleeve 13 with the peripheral grooves 41 in the coupling 33 so that oil flowing within the grooves 41 will flow through the recess 45 and into the passage 43 within the sleeve 13. With this construction, each recess 45 will always be in communication with the corresponding peripheral groove 41 in the coupling 33 as the coupling rotates, so that oil is continuously supplied to lines 44. The hydraulic lines 44 can be connected to the outriggers for the backhoe or to hydraulic motors for endless treads, if the backhoe is mounted on treads rather than a truck body.

The coupling 33 is also provided with a central opening 46 which is adapted to receive electrical cables used for remote control of the vehicle on which the backhoe is mounted. By use of the remote control, the backhoe operator can move the vehicle back and forth as well as operating the backhoe so that only one man is required to operate both the backhoe and the vehicle.

To provide a drag or braking force on the turntable rotation, a wear ring 47 formed of a wear-resistant metal, such as aluminum bronze, is secured to the bottom surface of U-member 16 and rides on the base casting 14 as the U-member 16 rotates.

In addition to the wear ring 47, an adjustable braking force can also be applied to the turntable. The upper end of hub 11 is formed with an inwardly extending flange or shelf 48 which supports a ring 49. Secured to the ring 49, are a series of pins 50 which extend upwardly from the ring and the upper ends of the pins project into openings in set screws 51 threaded within openings in upper casting 6. The ring 49 is urged downwardly against the flange 48 of hub 11 by coil springs 52 which positioned around the pins 50 and extend between the lower end of the set screws 51 and the ring 49. By adjustment of screws 51, the pressure of the springs 52 on ring 49 can be varied and this will provide a variable braking effect or drag on turntable rotation. In contrast to the braking effect provided by wear ring 47, the adjustable braking effect provided by ring 49 is achieved by the frictional contact between two rotating members, the ring 47 which rotates with the turntable 2 and the flange 48 of hub 11, both of which are rotating at different speeds.

The ball bearings 31 take both radial and thrust load during rotation of the turntable 2 and roll within aligned grooves 53 and 54 formed in the flange 29 of turntable 2 and the end 30 of casting 14, respectively. The balls 31 are spaced circumferentially within the grooves 53 and 54 by a spacing strip 55 having a series of holes 56 to receive the balls 31. During rotation of the turntable, the strip 55 will move freely within the clearance flange 29 and end 30.

Figure 8:
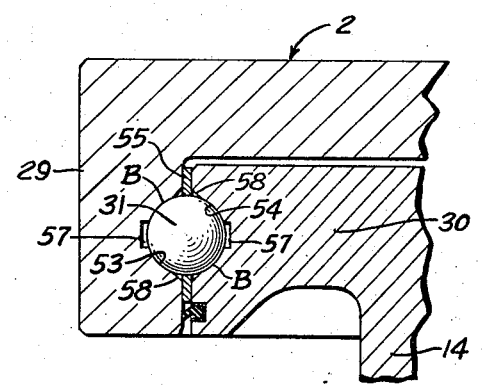
FIG. 8 is an enlarged fragmentary section of the ball bearing assembly.
Figure 7:
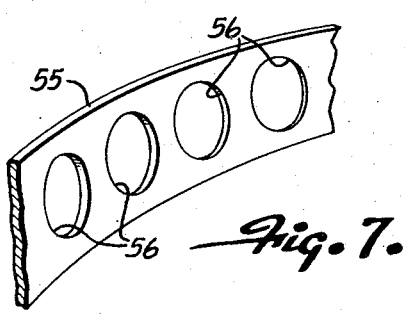
FIG. 7 is a perspective view of the retaining strip for the ball bearings.

As shown shown in FIG. 8, the grooves 53 and 54 are formed with the same radius of curvature as balls 31 so that there with be a line contact between the outer periphery of the balls and the walls of the grooves. This differs from the ordinary ball bearing assembly in which the ball normally has a slightly different radius of curvature than the socket so that the area of frictional contact between the ball and socket is minimized. In the present situation, the turntable rotates very slowly and load transmission is more important than journalling for rotation. Thus, the balls 31 are provided with the same radius of curvature as the grooves 53 and 54 which increases the area of contact for load transmission purposes.

To prevent excessive frictional contact or scrubbing between the balls 31 and grooves 53 and 54, the bottom of each groove is provided with a slot 57 and the outer edge of each groove is beveled or chamfered as indicated by 58. With this construction, the balls 31 contact the grooves 53 and 54 only along the arcs B, as shown in FIG. 8. It has been found that if arc B is substantially equal to the radius of the ball, the optimum relationship between load transmission and journalling is achieved. In other words, if the arc B is equal to the radius of the ball, a sufficiently great area of contact is provided to achieve the required load transmission and the resulting scrubbing of the balls against the grooves can be tolerated because of the slow speed of rotation of the turntable.

The turntable mechanism of the invention provides a full 360° rotation and can be used for providing a turntable rotation for any type of device, such as a crane, backhoe, shovel or the like. The drive mechanism is capable of producing a high reduction in speed with a minimum number of moving parts, and is substantially less costly and smaller in size than conventional units having the same reduction capacity.

The drive mechanism has greater strength than the normal gear train transmission in that a substantial number of teeth of each gear are in contact with teeth of the corresponding gear ring at any time. This is in contrast to the normal gear train in which only approximately 1½ teeth are in meshing engagement. As the power transmitting elements, as well as the journalling elements, all lie on substantially the same horizontal plane, the transmission of force is concentrated in that plane, thereby eliminating moment arms resulting from offset forces.

Various modes of carrying out the invention are contemplated as being within the scope of the following claims particularly pointing out and distinctly claiming the subject matter which is regarded as the invention.

I claim:

1. In an apparatus having a rotatable working member, a turntable to support the working member and disposed to rotate about an axis, an eccentric journalled for rotation about a second axis displaced from the first axis, means for rotating the eccentric, an annular member having a central opening to rotatably receive the eccentric, a first gear connected to the annular member and having a first series of teeth, a fixed base, a fixed first gear ring connected to the base and having a series of internal teeth disposed in engagement with the teeth on the first gear, the teeth in the first gear being the same size as the teeth on the first gear ring, and said first gear ring having a greater number of teeth than said first gear, a second gear connected to the annular member and having a substantially smaller diameter than the first gear, said second gear having a series of teeth, a second gear ring secured to the turntable and having a series of internal teeth engaged with the teeth on said second gear, the teeth on said second gear being the same size as the teeth on the second gear ring and the teeth on the second gear being the same size as the teeth on the first gear, said second gear ring having a greater number of teeth than the second gear and the difference in teeth between the first gear and the first gear ring being the same as the difference in the number of teeth between the second gear and the second gear ring, rotation of said second gear serving to rotate said second gear ring in the opposite direction from the direction of rotation of the second gear, and at a reduced speed, the midpoints of the axial length of the teeth of said first gear, first gear ring, second gear and second gear ring all lying in substantially the same plane, first journalling means for journalling the eccentric for rotation within said central opening, and second journalling means for journalling the turntable on said fixed base, the midpoints of the axial length of said first and second journalling means lying substantially in said plane.

2. The apparatus of claim 1, in which the eccentric is provided with a central hole axially aligned with said first axis, and including a fixed central member disposed within the hole, said base, central member and first gear ring being an integral unit.

3. The apparatus of claim 1, in which the annular member is generally U-shaped in cross section.

4. The apparatus of claim 1, and including braking means for providing a braking effect on movement of the turntable, said braking means being arranged to provide frictional contact between said annular member and said fixed base.

5. The apparatus of claim 1, wherein said eccentric is provided with a central hole axially aligned with said first axis, and including hydraulic coupling means disposed axially of the turntable and journalled within the hole in said eccentric, said hydraulic coupling means arranged to provide a coupling between a hydraulic power unit mounted on the rotating turntable and non-rotating elements utilizing hydraulic fluid.

6. The structure of claim 1, and including a fixed hollow sleeve secured to the base, said eccentric being journalled about said hollow sleeve, and a hydraulic coupling member journalled within the sleeve and connected to the turntable and disposed to rotate with the turntable.

7. The structure of claim 6, in which the hydraulic coupling member is provided with an axial passage to receive electrical cables.

8. In an apparatus having a rotatable working member, turntable means to support the working member and disposed to rotate about an axis, an eccentric, drive means for rotating the eccentric, a gear unit having a central opening to rotatably receive the eccentric and including a first gear and a second gear, said first gear and second gear each having a series of external teeth, a fixed base including a fixed first gear ring having a series of internal teeth disposed in engagement with the teeth on the first gear, said first gear ring having a greater number of teeth than the teeth of said first gear, and a second gear ring secured to the turntable means and having a series of internal teeth engaged with the teeth on said second gear, the second gear ring having a greater number of teeth than the teeth on said second gear, flange means extending outwardly from the periphery of the turntable means and spaced radially outward of the first gear ring, and bearing means disposed between said flange means and said base for journlling the turntble means for rotation with respect to said base.

9. The apparatus of claim 8, wherein said first gear ring has a substantially larger diameter than said second gear ring and said turntable means has a larger diameter than said first gear ring.

10. The structure of claim 9 wherein said drive means is mounted on said turntable means.

11. The structure of claim 8, wherein said drive means includes a drive shaft extending through said turntable means and operably connected to said eccentric, said drive shaft being offset radially from said axis.

12. The apparatus of claim 8, in which the bearing means comprises an annular spacing strip located in the space between said flange and said first gear ring and freely movable within said space, said strip having a series of spaced openings and a plurality of ball bearings located within the openings in said strip and disposed in contact with the adjacent surfaces of said flange and said first gear ring.

13. The apparatus of claim 12, in which the adjacent surfaces of said flange and said first gear ring are provided with aligned annular grooves to receive said ball bearings.

14. The apparatus of claim 13 in which the radius of the ball bearings is equal to the radius of curvature of the grooves.

15. The apparatus of claim 13, in which the grooves are provided with recesses extending longitudinally of said grooves, said recesses being arranged so that an arc, in a transverse direction with respect to the grooves, between adjacent recesses is substantially equal to the radius of the ball bearings.

References Cited

UNITED STATES PATENTS

| | | | |
|---|---|---|---|
| 1,604,619 | 10/1926 | Turner. | |
| 1,657,699 | 1/1928 | Synder. | |
| 1,903,218 | 3/1933 | Knight | 74—805 X |
| 2,026,880 | 1/1936 | Fliesberg et al. | 74—805 |
| 2,049,696 | 8/1936 | Fliesberg | 74—805 |
| 2,079,663 | 5/1937 | Rasmussen | 308—230 X |
| 2,098,299 | 11/1937 | Ljungkull | 212—69 X |
| 2,313,084 | 3/1943 | Manly | 212—68 |
| 2,614,743 | 10/1952 | Arps | 188—83 X |
| 2,693,722 | 11/1954 | Winther | 74—750 |
| 2,852,149 | 9/1958 | Bruneri et al. | 212—68 X |
| 2,877,905 | 3/1959 | Wiley | 188—83 X |
| 3,056,315 | 10/1962 | Mros | 74—805 |
| 3,193,109 | 7/1965 | Kerridge | 212—69 X |
| 3,250,401 | 5/1966 | Davidson | 212—69 X |
| 3,253,724 | 5/1966 | Marner | 212—63 X |
| 3,255,840 | 6/1966 | Tangen | 74—805 X |

FOREIGN PATENTS

| | | |
|---|---|---|
| 649,072 | 12/1928 | France. |
| 771,247 | 10/1934 | France. |
| 1,184,067 | 7/1959 | France. |
| 652,672 | 11/1937 | Germany. |
| 905,631 | 9/1962 | Great Britain. |
| 951,813 | 3/1964 | Great Britain. |

ROBERT M. WALKER, *Primary Examiner.*

DONLEY J. STOCKING, ARTHUR T. McKEON,
*Examiners.*

J. R. BENEFIEL, *Assistant Examiner.*